United States Patent [19]
Weeks, II

[11] Patent Number: 5,120,706
[45] Date of Patent: Jun. 9, 1992

[54] DRIVE SYSTEM EMPLOYING FRICTIONLESS BEARINGS INCLUDING SUPERCONDUCTING MATTER

[75] Inventor: David E. Weeks, II, Jerusalem, Israel

[73] Assignee: University of Arkansas, Little Rock, Ark.

[21] Appl. No.: 500,933

[22] Filed: Mar. 29, 1990

Related U.S. Application Data

[62] Division of Ser. No. 325,300, Mar. 17, 1989, Pat. No. 5,061,679.

[51] Int. Cl.$^5$ .............................................. H01B 12/00
[52] U.S. Cl. ........................................ 505/1; 310/52; 310/90.5; 250/231.13; 335/126; 505/700; 359/234
[58] Field of Search ................. 310/90.5, 10, 40 R, 310/52; 250/231.12, 231.13; 350/273, 274; 318/254, 480; 335/126; 505/1, 700; 388/933

[56] References Cited

U.S. PATENT DOCUMENTS

| | | |
|---|---|---|
| 3,026,151 | 3/1962 | Buchhold . |
| 3,898,545 | 8/1975 | Coppa .................................. 388/811 |
| 4,008,424 | 2/1977 | Bompani ............................. 388/814 |
| 4,545,209 | 10/1985 | Young . |
| 4,726,640 | 2/1988 | Iwama et al. . |
| 4,797,386 | 1/1989 | Gyorgy et al. . |
| 4,820,950 | 4/1989 | Hijiya et al. . |
| 4,886,778 | 12/1989 | Moon ................................. 310/90.5 |
| 4,892,863 | 1/1990 | Agarwala .......................... 310/90.5 |

FOREIGN PATENT DOCUMENTS 1283946 11/1968 Fed. Rep. of Germany .

OTHER PUBLICATIONS

"Levitation of a magnet over a flat type II superconductor", J. Appl. Phys. 63(2), Jan. 15, 1988.
"Levitation effects involving high $T_c$ thallium based superconductors", Appl. Phys. Lett. 53(12), Sep. 19, 1988.

Primary Examiner—R. Skudy
Attorney, Agent, or Firm—Hermann Ivester

[57] ABSTRACT

A device employing frictionless bearings including a mass of superconductor material having a superconducting temperature $T_c$ above about 77° K., a magnet having an axis of symmetry being levitated from said mass of superconductor material so as to be rotatable about its axis of symmetry, and a support member attached to the magnet, the support member being driven so as to cause the magnet to rotate about its axis of symmetry.

Additionally, there is included a frictionless commutator wherein a signal beam is intermittently interrupted by a member attached to the magnet, such intermittent interruption of the beam being detected and employed to cause alternate energization and de-energization of a solenoid which, in turn, creates a magnetic field. The solenoid magnetic field is employed to attract and repel second magnets positioned about the member so as to rotatably drive the first magnet.

16 Claims, 2 Drawing Sheets

U.S. Patent  June 9, 1992  Sheet 1 of 2  5,120,706
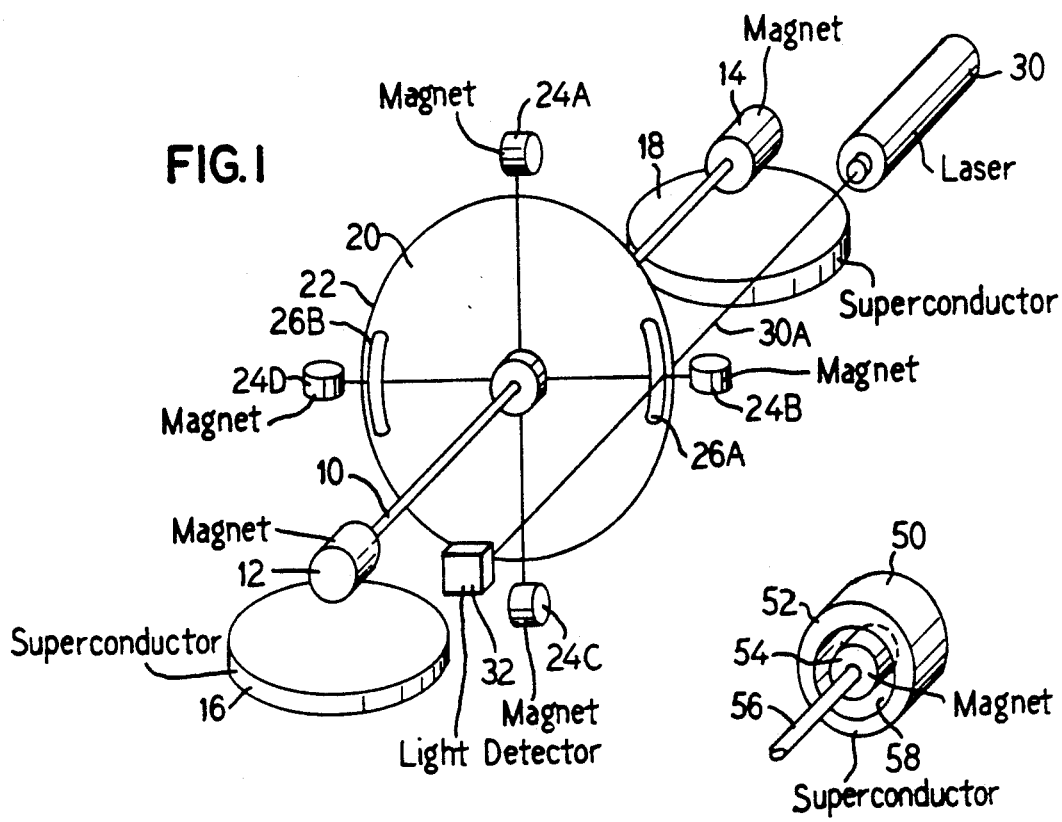
FIG. 1
FIG. 2
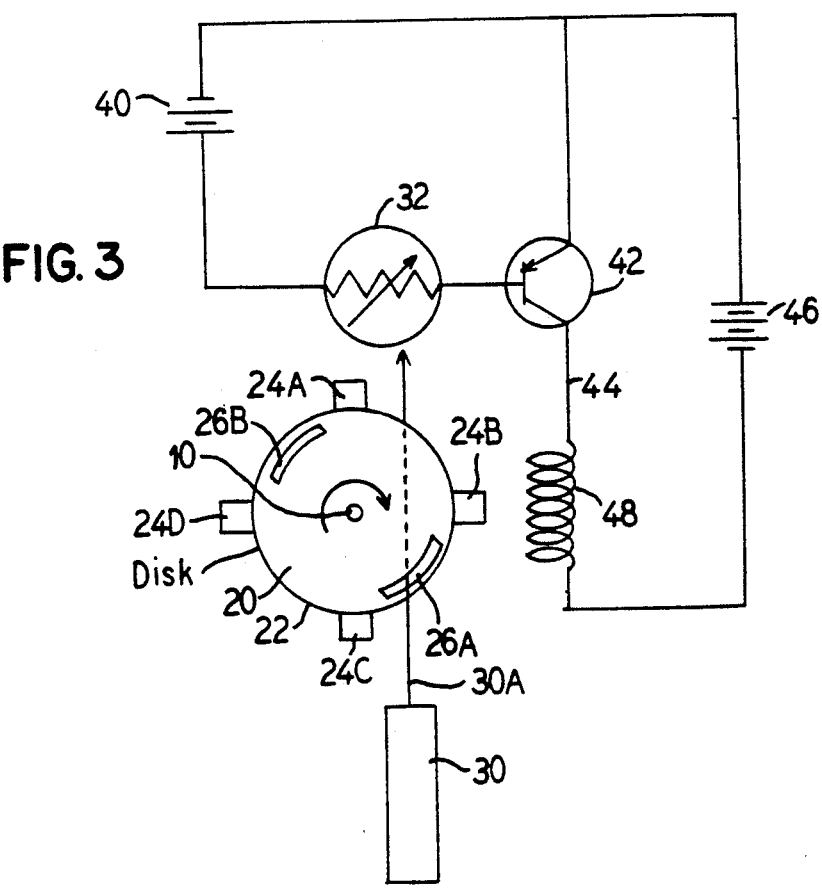
FIG. 3

DRIVE SYSTEM EMPLOYING FRICTIONLESS BEARINGS INCLUDING SUPERCONDUCTING MATTER

RELATED APPLICATION

This application is a division of my application Ser. No. 325,300 filed Mar. 17, 1989, U.S. Pat. No. 5,061,679.

BACKGROUND OF THE INVENTION

Field of the Invention

The present invention is generally directed to devices employing ceramic superconducting matter with a transition temperature above about 30° K. Additionally, the present invention is directed to drive systems.

In presently employed drive systems that utilize a rotating axle or shaft, the axle is directly or indirectly supported by rotating bearings. The bearings are employed to provide a reduced friction surface on which the axle rotates. However, because there still is friction between the rotating axle and the bearings, albeit a reduced amount, the bearings and axle are subject to wear. Accordingly, the efficiency of a system used to drive the axle is reduced not only by the original friction, but also by the further friction induced by the wearing of the parts.

In connection with electrical motors, commutators are employed to couple a power source to windings on the rotating shaft. When supplied with electrical power, the shaft winds act as magnetic poles and react with cooperating stationary magnets or windings so as to cause the shaft to rotate. Because the commutators engage a rotating part, the commutators are subject to extreme wear and must be replaced from time to time. The friction between the commutators and the rotating parts also decreases the efficiency of the motors due to the power required to overcome the friction.

SUMMARY OF THE INVENTION

The present invention provides a rotatably driven support member supported by at least one frictionless bearing. To this end, the invention utilizes superconducting matter to levitate at least one magnet connected to the support member, which magnet, based on current understanding, induces persistent currents in the superconducting matter. The persistent currents in the superconducting matter create magnetic flux lines that repel the magnet to thereby repel and levitate same. Certain of the flux lines penetrate the magnet and create vortices that provide lateral stability to the magnet so as to maintain the magnet in a specified position.

The invention also provides a frictionless commutator that is employed in cooperation with the drive system that rotatingly drives the support member. A signal beam is operatively oriented so as to traverse a member attached to the support member that intermittently cuts off the signal beam. An appropriate signal beam detector operatively drives a solenoid in response to detection of the signal beam. The solenoid cooperates with magnets attached to the support member so as to operatively impel and/or repel same to cause the support member to rotate.

In an embodiment, the invention includes cylindrical cobalt-samarium (Co-Sm) magnets located at ends of a shaft, the axes of the magnets aligning with the axis of the shaft. Each of the Co-Sm magnets is positioned above a mass of copper oxide perovskite matter so that persistent currents are induced by the Co-Sm magnets in the copper oxide perovskite matter, the persistent currents creating magnetic fields opposing the fields of the Co-Sm magnets.

In an embodiment of the drive system, an He-Ne laser is employed to direct a laser beam parallel to the shaft to be driven. A photocell is positioned so as to detect the beam. A disk that extends radially from the shaft generally interrupts the laser beam. However, a pair of slots in the disk intermittently allow the beam to pass through the disk as the disk rotates with the shaft. The photocell fires intermittently with receipt of the laser beam to, in turn, drive an amplifier coupled thereto. The amplifier, when so driven, causes a high current to traverse through a solenoid coupled to the amplifier so as to cause energization of the solenoid. The solenoid provides a magnet that cooperates with magnets mounted on the periphery of the disk so as to cause rotation thereof. The speed of rotation is controlled by proximity of the solenoid to the disk magnet and the amount of current sent to the solenoid.

Accordingly, an advantage of the invention is the employment of a frictionless bearing for a rotating shaft.

Another advantage of the invention is the provision of a frictionless commutator system for a motor.

Yet another advantage of the invention is the provision of bearings that require a minimum of applied torque to cause rotation of a rotatable part.

Yet a further advantage of the invention is an easy to produce, low-cost bearing arrangement that favorably competes on economic terms with other light weight, low friction bearings.

These and other advantages will become apparent from the following description of the preferred embodiments thereof, taken in conjunction with the accompanying drawings.

BRIEF DESCRIPTION OF THE DRAWINGS

FIG. 1 is a perspective view of an apparatus employing principles of the invention;

FIG. 2 is a perspective view of a bearing arrangement of a portion of a further device embodying principles of the invention;

FIG. 3 is an electrical schematic of a solenoid circuit for driving the arrangement of FIG. 1;

DETAILED DESCRIPTION OF THE PRESENTLY PREFERRED EMBODIMENTS

Figure 4:
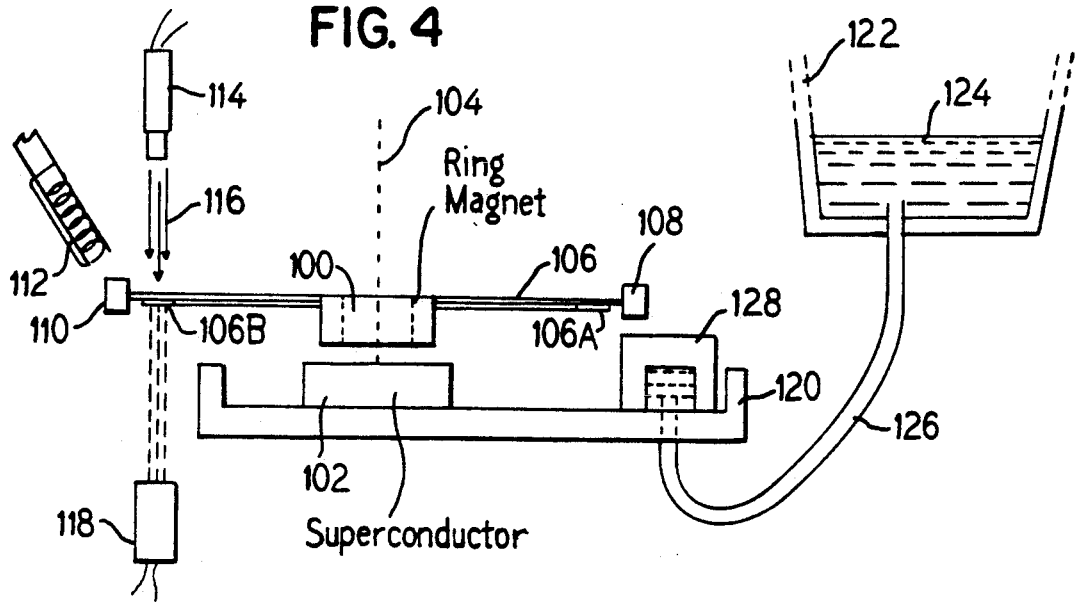
FIG. 4 is a diagram illustrating an alternate embodiment of the invention.

In FIG. 1 there is illustrated an apparatus embodying principles of the invention. The apparatus includes a shaft 10. On opposite ends of the shaft 10 are positioned and attached two cylindrical cobalt-samarium (Co-Sm) magnets 12 and 14, the axes of which are aligned and in registry with the axis of the shaft 10. Each of the magnets 12 and 14 is positioned above a mass of superconducting matter 16 and 18 (each being referred to hereinafter as a superconductor), respectively, preferably shaped as a disk. As such, the shaft 10 serves as a support member.

The superconductors 16 and 18 comprise any of the new class of copper oxide perovskite superconductors with a superconducting transition temperature $T_c$ greater than 77° K. Based on current understanding the magnets 12 and 14 are magnetically levitated by means of persistent currents generated in the disks 16 and 18, respectively, which, in turn, generate magnet fields that oppose the fields of the magnets 12 and 14. The persistent currents are induced by the two cylindrical magnets 12 and 14.

It can be appreciated that because the magnets 12 and 14 are levitated above the superconductors 16 and 18, respectively, the shaft 10 is levitated above its mount (in this case the superconductors 16 and 18). As a result, the shaft 10 does not frictionally engage its mount. Thus, the superconducting matter-magnet arrangement illustrated, creates two ultra-low to no friction bearings about which the shaft 10 may be easily rotated under the influence of a variety of driving mechanisms. The use of the superconductor bearings permits a levitated object to spin with a minimum of applied torque, offering an advantage over conventional bearings that, by definition, operate with friction.

Figure 6:
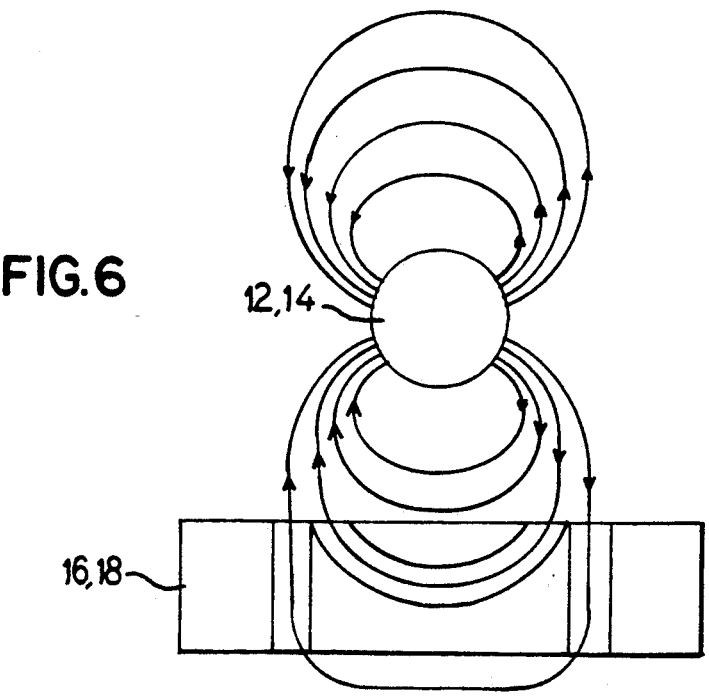
FIG. 6 is an elevational illustration of a magnet levitating above a superconductor mass including an illustration of the magnetic flux lines generated thereby.

As illustrated in FIG. 6, each of the magnets 12 and 14 is constrained within a given position by means of flux line vortices extending through the magnets 12 and 14 and the respective superconductors 16 and 18. It has been observed, as discussed in an article written by F. Hellman et al., entitled "Levitation of a Magnet Over a Flat Type II Superconductor," and published at 62 J. Appl. Phys. 447-450, (Jan. 15, 1988), that energy is required to move a magnet positioned above (or below) a type II superconductor. As such, it can be appreciated that the magnetic flux interaction between a magnet and superconductor alone constrains the magnets 12 and 14 within a given position and thereby provides lateral stability to same.

Essentially, as a magnet placed above a superconductor is moved, the pinned current vortices must move also. But it takes energy to move these vortices. However, rotation of a magnet, such as a cylinder or ring-shaped magnet about an axis of symmetry, is not affected by such flux trapping because the magnetic field is by definition invariant under such rotation. It can be appreciated that the use of such flux trapping for stabilizing levitated magnets is more simple and less expensive than the electromagnetic servo-mechanisms.

Although not illustrated, it is understood by those of skill in the relevant art, that due to the presence of the flux line vortices, the magnet illustrated in FIG. 6 can be levitated in inverted fashion (inverted levitation), whereby the magnet is suspended relatively below the superconductor. That is to say, the superconductor in FIG. 6 need only be rotated, by any amount, even by 180 degrees, and the magnet will still be positioned in the same vortices. Accordingly, the magnet can be levitated from the superconductor either relatively above, below, or to the sides of same. Thus the terms levitation or levitated are used only in a relative sense throughout this specification and the claims, unless otherwise noted.

As illustrated in FIG. 2, it is also possible to construct a superconductor 50 as to have an annular wall 52. A cylindrical magnet 54 attached to a shaft 56 can then be located within an interior 58 of the superconductor 50. Such an arrangement can provide yet greater lateral stability to the magnet 54 as a local potential minimum position would be formed along the central axis of the superconductor.

As further illustrated in FIGS. 1 and 3, the apparatus includes a disk 20 mounted o the shaft 10 such that the axis of the shaft 10 penetrates the center of the disk 20. Positioned about a periphery 22 of the disk 20, are four cobalt samarium magnets 24A-24D. The rotating disk is generally of a solid, non-light transmissive material and includes two slots 26A and 26B positioned in proximity with the periphery 22 of the disk 20. The magnets 24A-24D and slots 26A and 26B are utilized in cooperation with the driving system for the shaft 10.

The apparatus includes a laser 30, preferably a helium-neon laser, that is utilized to direct a signal, in this case a columnated beam of light or laser beam 30A, parallel to the axis of the shaft 10. The laser 30 is positioned at one end of the shaft 10, while a photocell or light detector 32 is positioned at the other end of the shaft 10. The photocell 32 detects the emission of the laser beam 30A by the laser 30.

As is illustrated in the figures, the laser beam 30A is directed at the rotating disk 20 such that as the disk 20 rotates in cooperation with the shaft 10. The slots 26A and 26B intermittently allow the laser beam 30A to pass through the disk 20. As such, the slots 26A and 26B and the disk 20 cooperate to act as a laser beam chopper.

As is illustrated most clearly in FIG. 3, the photocell 32 is placed in a series circuit with a power supply of 40 and an amplifier 42 It can be appreciated that when the photocell 32 receives or detects emission of the laser beam 30A, the photocell 32 allows current to conduct in the circuit from the power supply 40 to the base or drive of the amplifier 42 to thereby cause the amplifier 42 to create a large current draw through the wires 44. The amplifier 42 is powered by a second power supply 46.

As illustrated, the amplifier 42 causes current to be drawn through a solenoid 48. Because the solenoid 48 is located in proximity to the periphery of the disk 20, the solenoid 48 cooperates with the magnets 24A-24D to cause the disk 20 to rotate. As illustrated in FIG. 3 the magnets 24A-24D are arranged so that the disk 20 rotates in a clockwise direction. To this end, the magnets 24A-24D are positioned such that the south poles thereof are directed into the direction of rotation. In turn, the solenoid is positioned so that the north pole thereof aligns with the north poles of the magnets 24A-24D after the magnets have rotated past the solenoid. Accordingly, the north poles repel and cause the disk 20 to rotate. At the same time, the solenoid attracts the south pole of a magnet approaching the solenoid 48.

It can be appreciated that the use of the illustrated drive system creates a frictionless laser commutator. There are no parts of the commutator which frictionally engage the rotating shaft 10 or rotating disk 20. The use of the laser commutator avoids the inherent friction and wear of the conventional contact commutators. The use of the low power laser beam provides an effective electromagnetic switching and permits quick and easy alignment of the photocell 32, disk 20, and laser 30.

It can further be appreciated that the rotational velocity of the disk 20 is controlled by the placement of the solenoid 48 and the amount of current sent to the solenoid 48. That is to say, the closer the solenoid 48 is placed to the disk 20, the stronger are the repulsion and the attraction forces created between the solenoid 48 and the magnets 24A-24D.

Yet further, it can be appreciated that the number of slots, number of magnets 24A–24D, and solenoids 48 can be varied so as to provide different operating characteristics to the drive mechanism. Also, the laser beam need not be directed exactly parallel to the axis of rotation of the disk, so long as the beam is intermittently interrupted by a member in cooperation with the rotation of the shaft 10.

In FIG. 4 there is illustrated an alternate embodiment of the invention, wherein a ring magnet 100 is levitated above a superconductor 102 in accordance with the principles of the invention. As illustrated, the ring magnet 100 rotates about an axis of symmetry 104 that is oriented perpendicularly relative to the mass of superconductivity material 102. Accordingly, the ring magnet 100 is in a position that is at a right angle to the position of either the magnets 12 or 14 of the embodiment illustrated in FIG. 1.

In the embodiment illustrated in FIG. 4, the support arm 106 is supported on or by the magnet 100. Accordingly, the support arm 106 rotates about the axis 104 above the mass of superconductor 102. It can be appreciated that various other support arms or elements can be mounted on the ring magnet 100 or the support arm 106 so as to co-rotate therewith. Such support arms or elements could include a shaft extending along the axis 104.

Figure 5:
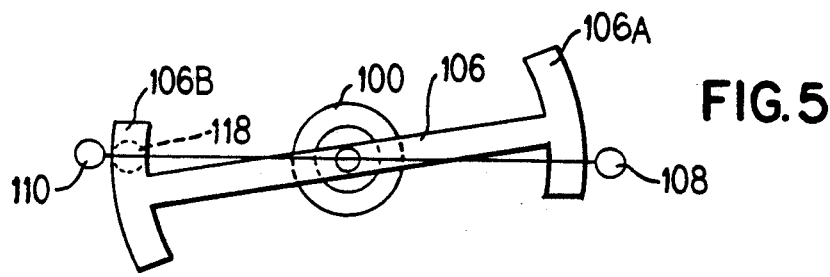
FIG. 5 is a top view of a portion of the embodiment illustrated in FIG. 4 taken generally along the line V—V.

To drive the arrangement illustrated in FIGS. 4 and 5, an arrangement similar to that described in connection with FIGS. 1 and 3 is employed. To this end, a pair of magnets 108 and 110 are located at ends of the support arm 106, which magnets are retracted and repelled by means of a solenoid 112 connected to the circuit similar to that illustrated in FIG. 3. The solenoid 112 functions in a manner similar to the solenoid 48.

Additionally, the support arm 106 includes two members 106A and 106B located at axial ends of the arm 106, which members serve as photo-interrupters. As illustrated, a laser 114 is employed to generate a laser signal 116 that is detected by a photo-detector 118. The members 105A and 106B intermittently interrupt the signal 116 so as to cause the solenoid 112 to energize and de-energize, as discussed above.

Also illustrated in FIG. 4, is an arrangement for supplying a coolant, such as liquid nitrogen, about the mass of superconductor 102, When the superconductor 102 is in a horizontal position relative to the earth. To this end, the arrangement includes a dish 120 within which the superconductor 102 rests. Located vertically above the dish 120 is a reservoir 122 containing a supply of liquid nitrogen 124. The supports for the dish 120 and reservoir 122 are not illustrated inasmuch as they are considered obvious to those of ordinary skill in the relevant art.

A feed tube 126 is employed as a conduit between the reservoir 122 to the dish 120. The liquid nitrogen 124 flows into the dish 120 by means of the conduit 126. A baffle 128, preferably made out of cork, is placed above the discharge end of the tube 126 within the dish 120 so as to regulate the discharge of the liquid nitrogen into the dish 120. This baffle prevents the liquid nitrogen from splashing about. Furthermore, by restricting the inflow of liquid nitrogen, the baffle 128 serves to prevent the liquid nitrogen from overflowing out of the dish 120, thereby reducing waste of same.

As is well-known in the relevant art, the superconductor 102 must be kept to below a maximum critical temperature, which temperature varies depending on the superconductor material employed. Accordingly, the liquid nitrogen serves this purpose when it fills the inside of the dish 120 about the superconductor 102.

It can also be appreciated that because the levitation of a magnet from a mass of type II superconductor matter is relative, a drive system can also be designed, wherein the magnet is held fixed while a mass of superconducting material is free to rotate. Accordingly, one need only construct the system so that the mass of superconductor matter has an axis of symmetry. A support member is then attached to the mass of superconductor matter.

While a preferred embodiment has been illustrated, many other modifications and variations which fall within the spirit and scope of the invention will be obvious to those skilled in the art. It is intended that those modifications and variations be covered also by the attached claims.

I claim:

1. An apparatus, comprising:
   (a) a rotatable shaft member;
   (b) driving means for driving the shaft member comprising first magnets operatively secured about the shaft member about a radius thereof and means for generating a magnetic field positioned near an outer radius circumscribed by said first magnets;
   (c) means for generating a signal;
   (d) means attached to the shaft member for intermittently interrupting the signal; and
   (e) means for detecting the signal and operatively associated with the driving means to actuate said means for generating said magnetic field to drive the shaft member in rotating fashion by repelling and attracting said first magnets.

2. The apparatus of claim 1, wherein the driving means comprises said first magnets equidistantly spaced at radial positions along a circle about the shaft member and a solenoid positioned in proximity to said circle.

3. The apparatus of claim 1, wherein the means for generating a signal comprises means for generating a light beam, and the signal comprises said light beam.

4. The apparatus of claim 3, wherein the means for detecting the signal includes a photocell operatively coupled to an amplifier driving input.

5. The apparatus of claim 4, wherein an amplifier is positioned in a circuit including another power supply and a solenoid so that detection of the beam causes the amplifier to thereby energize the solenoid to drive the shaft member.

6. The apparatus of claim 3, wherein the means for generating a light beam comprises a laser and the light beam comprises a laser beam.

7. The apparatus of claim 3, wherein the means for intermittently interrupting the signal includes a disk positioned about the shaft member, the disk interrupting the light beam, but including apertures through which the beam can pass.

8. The apparatus of claim 7, wherein the first magnets attached to the shaft member are attached about a periphery of the disk.

9. The apparatus of claim 1, wherein the shaft member is supported in levitated fashion by a pair of second magnets, said second magnets attached on opposite ends of said shaft member, each second magnet being positioned above a superconductor having Type II superconducting properties, so that, based on current understanding, each second magnet induces persistent currents in its superconductor to thereby levitate the shaft member above the superconductors.

10. The apparatus of claim 9, wherein the second magnets are made of cobalt samarium.

11. The apparatus of claim 9, wherein the second magnets are cylindrically shaped.

12. The apparatus of claim 9, wherein the superconductors are made of a copper oxide perovskite having a superconducting temperature $T_c$ above 77° K.

13. In a method of driving a rotatable shaft in non-contact fashion, the steps comprising:
  (a) providing said rotatable shaft with a disk attached thereto such that the disk is perpendicular to an axis of the shaft, the disk having a plurality of magnets disposed about an outer periphery of the disk;
  (b) generating a signal beam;
  (c) detecting the signal beams;
  (d) intermittently interrupting the signal beam in accordance with rotation of the shaft;
  (e) energizing a solenoid positioned adjacent a circle circumscribed by the magnets on the disk in accordance with detection of the signal beam; and
  driving the shaft in rotatable fashion by repelling and attracting the magnets positioned about the shaft with the solenoid.

14. In the method of claim 13, directing the signal beam parallel to an axis of rotation of the shaft.

15. In the method of claim 13, passing the signal beam through said disk attached to the shaft.

16. In the method of claim 13, driving an amplifier upon detection of the signal beam.

* * * * *